United States Patent [19]
Weitzen et al.

[11] Patent Number: 5,278,546
[45] Date of Patent: Jan. 11, 1994

[54] SELECTIVE CALL RECEIVER HAVING RECEIVED MESSAGE INDICATORS

[75] Inventors: Randi F. Weitzen, Greenacres City; Mark T. Stair, Delray Beach, both of Fla.

[73] Assignee: Motorola, Inc., Schaumburg, Ill.

[21] Appl. No.: 860,115

[22] Filed: Mar. 30, 1992

Related U.S. Application Data

[63] Continuation of Ser. No. 608,668, Nov. 5, 1990, abandoned.

[51] Int. Cl.$^5$ .............................................. H04Q 1/00
[52] U.S. Cl. ..................... 340/825.44; 379/67; 345/145; 345/188
[58] Field of Search ................ 340/825.44, 721, 311.1; 379/67

[56] References Cited

U.S. PATENT DOCUMENTS

| | | | |
|---|---|---|---|
| 4,336,524 | 6/1982 | Levine | 340/825.44 |
| 4,385,295 | 5/1983 | Willard et al. | 340/311.1 |
| 4,392,135 | 7/1983 | Ohyagi | 340/825.44 |
| 4,613,859 | 9/1986 | Mori | 340/825.44 |
| 4,639,723 | 1/1987 | Boughton | 340/825.44 |
| 4,786,902 | 11/1988 | Davis et al. | 340/825.44 |
| 4,851,829 | 7/1989 | Deluca et al. | 340/825.44 |
| 4,949,085 | 8/1990 | Fisch et al. | 340/825.44 |
| 5,075,684 | 12/1991 | Deluca | 340/825.44 |

Primary Examiner—Donald J. Yusko
Assistant Examiner—Brian Zimmerman
Attorney, Agent, or Firm—Keith A. Chanroo; Thomas G. Berry; Daniel R. Collopy

[57] ABSTRACT

A selective call receiver (100) comprises means for receiving messages (104) and memory means (108) for storing the received messages. Displaying means (130) for displaying the stored messages and a predetermined number of indicators (212) representative of a corresponding predetermined number of stored messages. Means for activating (306) the indicators in a predetermined sequence of activated indicators (210) on the displaying means (130) when the received messages are stored. Means (306) wherein the activating means (306) responds to the deleting means by deactivating the indicator associated with the stored message being deleted resulting in a gap (218) being displayed in the sequence of activated indicators (210) at the position occupied by the deactivated indicator. Means for repositioning (310) the sequence of activated indicators being displayed (210) to eliminate the gap (218) in the sequence of activated indicators (210) while maintaining the positional relationship of the activated indicators being displayed (210).

9 Claims, 3 Drawing Sheets

SELECTIVE CALL RECEIVER HAVING RECEIVED MESSAGE INDICATORS

This is a continuation of application Ser. No. 07/608,668, filed Nov. 5, 1990 now abandoned.

FIELD OF THE INVENTION

This invention relates in general to selective call receivers, and more specifically to a selective call receiver with a received message indicator.

BACKGROUND OF THE INVENTION

Typically, a selective call receiver, upon receiving a message, stores the message in memory for review at a later time. However, the number of message storage slots are limited. Thus, when the memory storage slots are full, the arrival of new messages may be stored at the expense of deleting older messages. One such method currently used is to delete the oldest message to accommodate a just received message. Unfortunately, if a user wishes to review an older message, it may have been automatically deleted.

Current integrated circuit technologies have increased memory capacity. As a result, selective call receivers can store more messages. This significantly reduces the need for automatically deleting messages. However, as the number of stored messages increases, the ease of managing the messages decrease, making it more difficult for selective call receiver users to retrieve or locate a desired message. Furthermore, because selective call receiver users tend to randomly read and delete messages, a just received message is usually placed in the first available memory slot. In this way, the incoming messages become randomly placed throughout the available message memory. Unfortunately, this method of storing incoming messages makes it difficult for selective call receiver users to distinguish between old and new messages. That is, selective call receiver users may not be able to easily determine the time priority of the received messages or where the latest received message was stored.

Thus, what is needed is a method for retrieving stored messages that enables a selective call receiver user to quickly and easily determine the time priority of the messages stored in memory.

SUMMARY OF THE INVENTION

A selective call receiver comprises means for receiving messages and memory means for storing the received messages. Displaying means for displaying the stored messages and a predetermined number of indicators representative of a corresponding predetermined number of stored messages. Means for activating the indicators in a predetermined sequence of activated indicators on the displaying means when the received messages are stored. Means wherein the activating means responds to the deleting means by deactivating the indicator associated with the stored message being deleted resulting in a gap being displayed in the sequence of activated indicators at the position occupied by the deactivated indicator. Means for repositioning the sequence of activated indicators being displayed to eliminate the gap in the sequence of activated indicators while maintaining the positional relationship of the activated indicators being displayed.

A method for maintaining a priority of a plurality of stored messages, comprises the steps of: (a) activating indicators on a display in a predetermined sequence of activated indicators representing an order in which the plurality of stored messages were received; (b) displaying the stored messages, and a predetermined number of indicators representative of a predetermined number of stored messages; (c) deleting any one of the stored message wherein said step of activating further including the step of deactivating, in response to the step of deleting, for deactivating the indicator associated with the stored message being deleted resulting in a gap being displayed in the sequence of activated indicators at the position occupied by the deactivated indicator; and (d) repositioning the sequence of activated indicators being displayed to eliminate the gap in the sequence of activated indicators while maintaining the priority relationship of the activated indicators being displayed.

DESCRIPTION OF A PREFERRED EMBODIMENT

Figure 1:
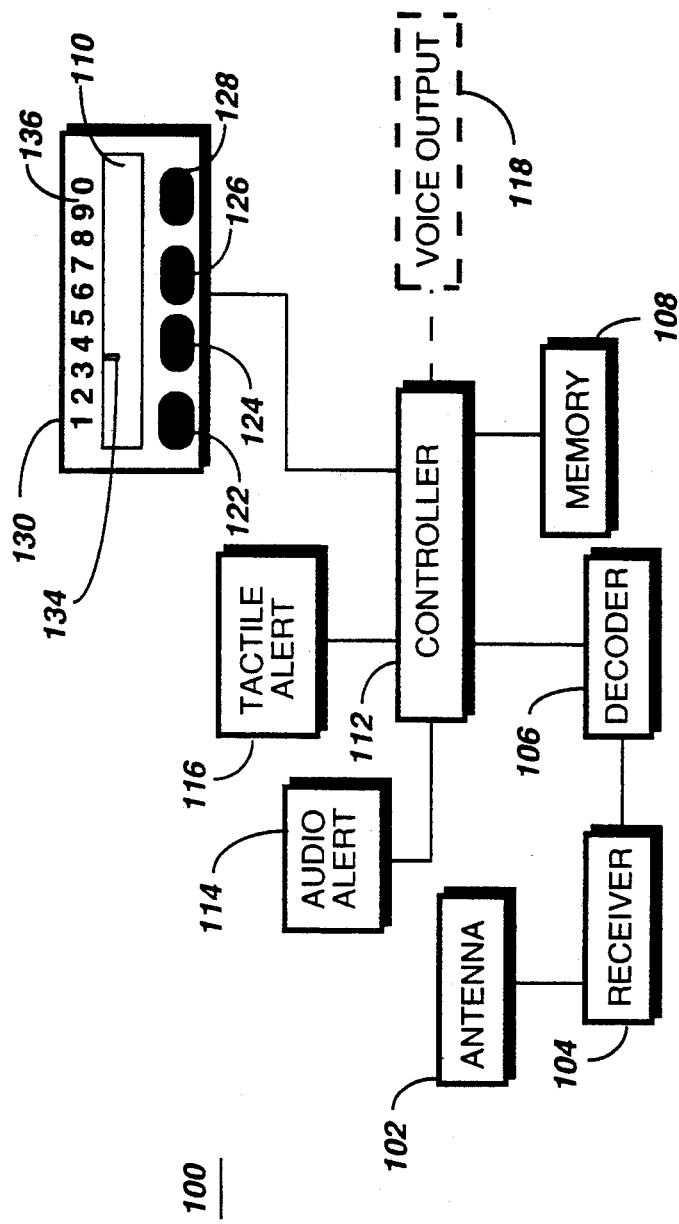
FIG. 1 is a block diagram of a selective call receiver in accordance with the present invention.

Referring to FIG. 1, a selective call radio receiver 100 (e.g., a pager) comprises an antenna 102 that provides an radio frequency (RF) carrier signal that is mixed with a local oscillator signal contained within a receiver module 104. The receiver module 104 generates a recovered signal suitable for processing by a decoder 106 in a manner well known to those skilled in the art. The decoder 106 processes the received signal to a decode an address. A controller 112 compares the decoded address with one or more predetermined addresses contained in a memory 108. When the addresses are substantially similar, the user is alerted that a signal has been received either by an audio alert (e.g., a speaker or transducer) 114 or a tactile alert (e.g., a vibrator) 116. The received signal may also include optional message data directed to some selective call receivers. Also, if the selective call receiver includes an optional voice output 118, recovered audio components of the received R.F. signal may be presented. For a message selective call receiver, the recovered message is stored in a memory 108 for subsequent presentation. The output display 130 will automatically, or when manually selected by controls 122, 124, 126, and 128 present the message, such as by displaying the message on a display screen 110.

The output display 130 further includes a pointer or indicator 134 that may be scrolled (moved) in either a left or right direction. For example, depressing key 128 will move the pointer 134 to the right of a current pointer position to an appropriate message number identified by a label 136. The label 136 includes a plurality of numbers associated with different pointer positions. The number of positions are not limited to those shown on the label 136, but will depend substantially on the size of the memory 108. Alternately, depressing key 122 will move the pointer 134 to the left of the current pointer position. It can be appreciated that the method and number of key strokes for moving the pointer 134 is not limited to the above description. Additionally, depressing key 124 will present the corresponding message identified by the pointer 134 on the display screen 110, and depressing key 126 will delete the message from memory and the message indicator (shown in FIG. 2) from the display screen 110.

Figure 2A:
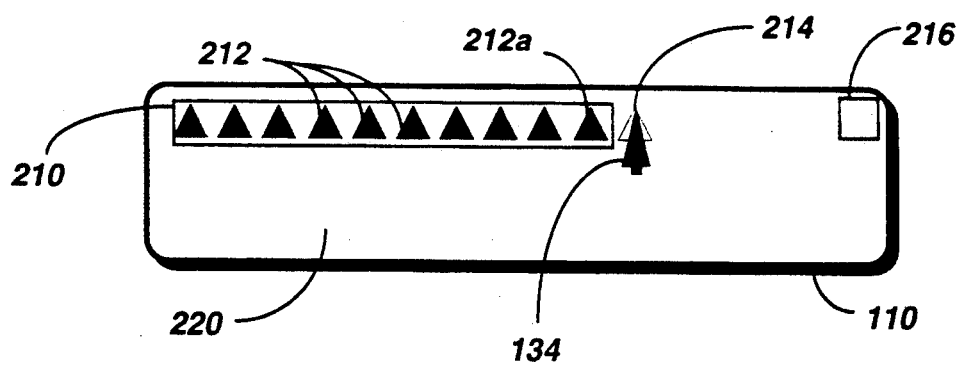
FIG. 2A-2C are illustrations of a display of the selective call receiver in accordance to the invention in FIG. 1.
Figure 2B:
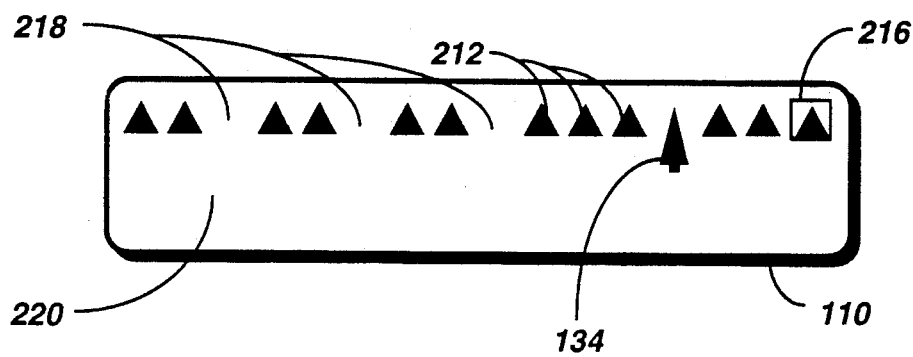
Figure 2C:
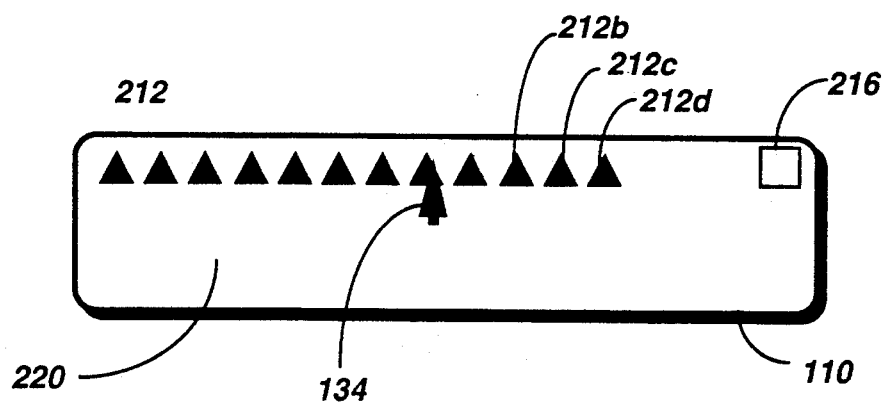

FIGS. 2A-C show a more detailed illustration of the preferred display screen 110. According to the invention, when the selective call receiver receives a message, the message is stored in memory 108 (see FIG. 1). Subsequently or simultaneously, a message indicator 212 is positioned on the display screen 110. As shown in FIG. 2A, an area on the display screen is preferably provided for the display of a plurality of message indicators 210. The remaining area 220 is used to display a message associated with one of the plurality of message indicators 210. It can be appreciated that the area reserved for the plurality of message indicators may be assigned to any portion of the display screen 110, for example, the top or the bottom portions of the display screen 110. The black triangular indicators 112 represent or denote messages and a pointer 134 donates which message currently stored in memory may be processed (i.e., read, printed, or deleted). The white (or unshaded) message indicator 214 denotes the preferred position of a next message indicator in response to a next received and stored message. Corresponding to a received and stored message, a message indicator is positioned to the right of and adjacent to the latest positioned message indicator 212a. In this way, the latest received message may be accessed by positioning the pointer 134 on the rightmost message indicator. Thus, moving the pointer 134 leftward will access earlier received messages (i.e., lower time priorities). It can be appreciated that the highest time priority message may be alternatively placed to the left of the plurality of message indicators instead of the right. Those of ordinary skill will also appreciate that any appropriate arrangement may be used to identify the priority of the stored messages.

Referring to FIG. 2B, the display screen 110 is shown filled with a plurality of message indicators. The display screen 110 also shows a few missing message indicators 218. According to the invention, the selective call receiver user will be able to readily locate the message indicator associated with latest received message since it is placed adjacent and to the right of the latest positioned message indicator.

As previously discussed, the selective call receiver user after selecting and reading a message, may delete a message of his choice by activating the appropriate sequences of control buttons. In this way, the vacant message indicator positions 218 are created. According to the invention, the subsequent message indicators will only be positioned to the right of the latest positioned message indicator resulting in the deleted message indicators 128 remaining on the display 110. Thus, the invention avoids the confusion of the prior art practice of randomly placing new message indicators in the gap 218.

The selective call receiver will continue receiving and storing messages and positioning message indicators substantially adjacent to the latest positioned message indicator. However, when a received and stored message results in a message indicator being positioned at a threshold position 216, the display 110 can no longer present message indicators to the right and adjacent to the threshold positioned message indicator 216. Those skilled in the arts will appreciate that the threshold may also correspond to a pre-determined number of message indicators Unfortunately, there is no more available indicator positions. According to the invention, the selective call receiver will reallocate the message indictor portion of the display 110 upon receipt of the next message. The reallocation substantially consists of moving all their message indicators to their left filling in all vacant positions 218 created by previously deleted messages. This reallocation maintains the message indicator's time priority position with respect to all other remaining message indicators. In this way, the selective call receiver will cause all message indicators to be positioned in the known sequence. As messages are subsequently read and deleted, vacant message indicator positions are ignored until the threshold position is again reached. Upon reaching the threshold position, the selective call receiver will again reallocate the message display maintaining the time priority of the message indicators with respect to each other.

Referring FIG. 2C, the display 110 is shown after the reallocation, which results in an orderly arrangement of message indicators. For example, the message indicator 212b, by its position, was received later than all message indicators to its left. Similarly, message indicator 212c arrived after message indicator 212b and message indicator 212d corresponds to the latest received message (as shown). In this way, the selective call receiver reallocates the positions of the message indicators corresponding to a predetermined threshold. This reallocation maintains the message indicators received time priority with respect to each other, while filling in vacant position created by deleted messages.

According to the invention, subsequent message indicators corresponding to subsequent received messages are prevented from being arbitrarily or randomly positioned in the first available message indicator slot. The technique of this invention results in a prioritized message indicator display that remains even if a user creates a vacant message indicator position by deleting a stored message. In this fashion, the selective call receiver does not have to continuously monitor the message indicators to maintain existing priority scheme. Furthermore, the reallocation causes the vacant message positions to be cleared to facilitate further positioning of message indicators.

Figure 3:
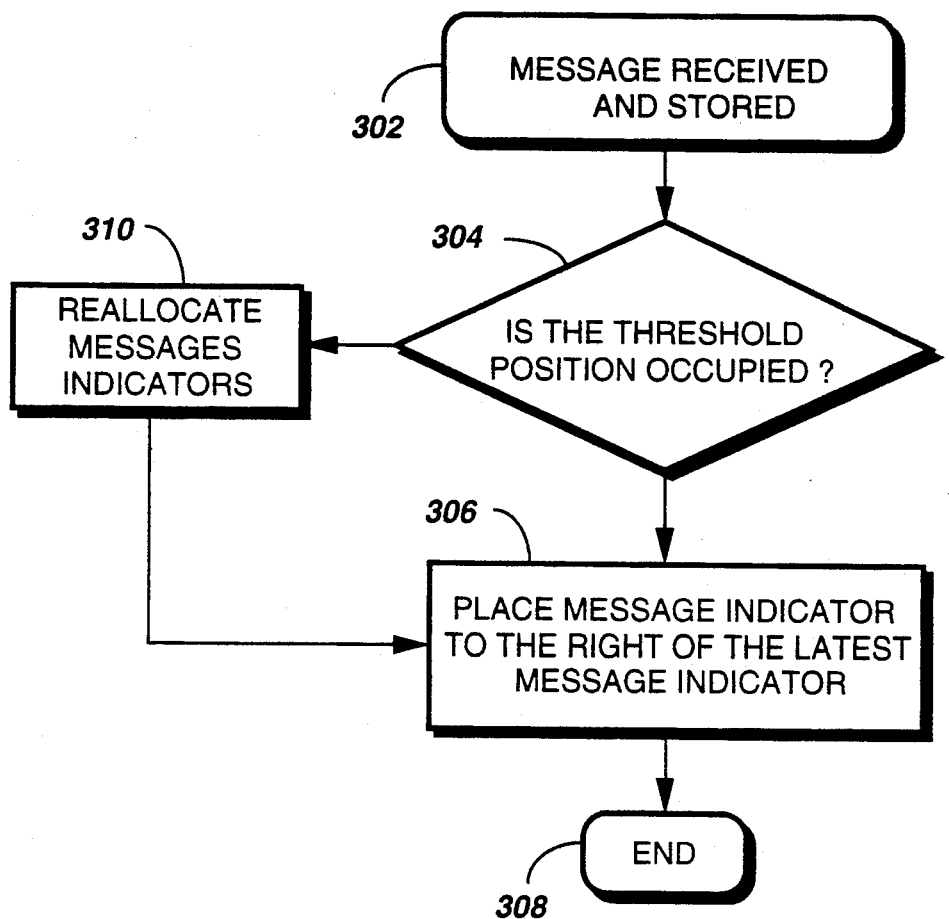
FIG. 3 is a flow diagram illustrating the steps executed by the selective call receiver of FIG. 1 in accordance with the invention.

FIG. 3 is a flow diagram illustrating the steps executed by the selective call receiver in accordance with the invention. In step 302, the received message is stored. The selective call receiver checks if the threshold position is already occupied by a message indicator, step 304. If unoccupied, a message indicator is placed substantially adjacent to the lastest positioned message indicator, and more specifically the message is placed to the right of the latest existing message indicator, step 306. The process ends at step 308. However, if the the threshold position is occupied, the display of message indicators are reallocated. That is, the filling in of all deleted message positions while maintaining the respective message indicator priorities, step 310. In this way, the reallocation causes vacant message positions to be replaced with valid message indicators. This maintains the time prioritization of message indicators without forcing the selective call receiver to continuously monitor the display of indicators.

In summary, a selective call receiver displays a plurality message indicators representing or associated with stored messages. The display positions a next message indicator substantially adjacent to a latest positioned message indicator, and reallocates the display presentation in response to the next message indicator exceeding a threshold of message indicators on the display. In this way, the selective call receiver will cause all message indicators to be positioned in a known time prioritized sequence. As messages are read and deleted, the vacant message indicator positions are ignored until a threshold position is reached. Upon reaching the threshold position, the selective call receiver reallocates the message display maintaining the time priority of the message indicators with respect to each other. In this way, the reallocation causes vacant message positions to be replaced with valid message indicators. This furthers the prioritization of message indicators without forcing the selective call receiver to continuously monitor the display of indicators.

We claim:

1. A selective call receiver, comprising:
   means for receiving messages;
   memory means for storing the received messages;
   displaying means for displaying the stored messages, and a predetermined number of indicators representative of a corresponding predetermined number of stored messages;
   means for activating the indicators in a predetermined sequence of activated indicators on said displaying means when the received messages are stored;
   means for deleting any one of the stored messages from said memory means wherein said activating means, being responsive to said deleting means, deactivates the indicator associated with the stored message being deleted resulting in a gap being displayed in the sequence of activated indicators at the position occupied by the deactivated indicator; and
   means for repositioning the sequence of activated indicators being displayed to eliminate the gap in the sequence of activated indicators while maintaining the positional relationship of the activated indicators being displayed.

2. The selective call receiver according to claim 1 further comprising means for initiating the repositioning means in response to a message indicator being activated in a predetermined indicator position in the sequence of activated indicators.

3. The selective call receiver according to claim 1 further comprising means for initiating the repositioning means in response to a threshold number of indicators being displayed in the sequence of activated indicators.

4. The selective call receiver according to claim 1 wherein the display means comprises an area for displaying the indicators and a remaining area for displaying the stored messages.

5. The selective call receiver according to claim 1 wherein the display means further includes an inhibiting means for inhibiting the displaying of a subsequent indicator in the gap created in the sequence of activated indicators until the sequence of activated indicators is repositioned by said repositioning means for eliminating the gap being displayed therein.

6. A method for maintaining a priority of a plurality of stored messages, comprising the steps of:
   (a) activating indicators on a display in a predetermined sequence of activated indicators representing an order in which the plurality of stored messages were received;
   (b) displaying the stored messages, and a predetermined number of indicators representative of a predetermined number of stored messages;
   (c) deleting any one of the stored message wherein said step of activating further including the step of deactivating, in response to said step of deleting, for deactivating the indicator associated with the stored message being deleted resulting in a gap being displayed in the sequence of activated indicators at the position occupied by the deactivated indicator; and
   (d) repositioning the sequence of activated indicators being displayed to eliminate the gap in the sequence of activated indicators while maintaining the priority relationship of the activated indicators being displayed.

7. The method for maintaining the priority of access to the stored messages according to claim 6 wherein subsequent indicators, in response to messages being subsequently received, are activated and displayed in a position substantially adjacent to a most recently activated indicator within the sequence of activated indicators.

8. The method for maintaining the priority of access to the stored messages according to claim 6 wherein an at least one previously deactivated indicator creates an at least one vacant position within the sequence of activated indicators, and said step of repositioning repositions the sequence of activated indicators being displayed to fill the vacant positions created therein by the previously deactivated indicators to maintain a time priority position of the activated indicators being displayed within the sequence.

9. The method for maintaining the priority of access to the stored messages according to claim 6 wherein the step of activating further includes the step of inhibiting for inhibiting the indicator from being displayed in the gap until the sequence of activated indicators is repositioned for eliminating the gap being displayed therein.

* * * * *